United States Patent [19]

Green et al.

[11] Patent Number: 5,119,250

[45] Date of Patent: Jun. 2, 1992

[54] METHOD AND APPARATUS FOR PERFORMING A SEEK

[75] Inventors: Martin R. Green; John J. Stephenson; Michael C. Stich, all of Rochester, Minn.

[73] Assignee: International Business Machines Corporation, Armonk, N.Y.

[21] Appl. No.: 538,958

[22] Filed: Jun. 15, 1990

[51] Int. Cl.⁵ .............................................. G11B 5/55
[52] U.S. Cl. ............................ 360/78.06; 360/78.04; 360/78.09; 318/561; 318/632
[58] Field of Search ............... 360/78.04, 78.06, 78.09; 318/561, 632

[56] References Cited

U.S. PATENT DOCUMENTS

| | | | |
|---|---|---|---|
| 4,030,132 | 6/1977 | Iftikar et al. | 360/78.06 |
| 4,544,968 | 10/1985 | Anderson et al. | 360/78.06 |
| 4,899,234 | 2/1990 | Genheimer | 360/78.06 |
| 4,982,298 | 1/1991 | Volz et al. | 360/78.06 |

OTHER PUBLICATIONS

Commander et al., *Disk File Track Access Control*, IBM Technical Disclosure Bulletin, vol. 16, No. 12, May 1974, pp. 4064-4065.

*Primary Examiner*—Aristotelis Psitos
*Assistant Examiner*—David L. Robertson
*Attorney, Agent, or Firm*—Richard E. Billion

[57] ABSTRACT

Disclosed is a method for performing a seek operation in a disk drive using current in the saturation mode to accelerate and decelerate the actuator arm. In a first embodiment, several measurements are made during the acceleration portion of the seek to estimate the deceleration available in saturation mode. In a second embodiment, the point at which the current is switched from acceleration current to deceleration current is adjusted based upon the position where the actuator arm comes within a desired amount of the velocity of a velocity profile assuming worst case conditions.

23 Claims, 5 Drawing Sheets

METHOD AND APPARATUS FOR PERFORMING A SEEK

FIELD OF THE INVENTION

The present invention pertains to the field of disk drives which are also called direct access storage devices (DASD).

More particularly, this invention pertains to the method and apparatus for reducing the time necessary to move a transducer attached to the actuator arm from one position to another position on the disk. In other words, this invention pertains to reducing the seek time for a disk drive.

BACKGROUND OF THE INVENTION

One of the key components of a computer system is a place to store data. Typically computer systems employ a number of storage means to store data for use by a typical computer system. One of the places where a computer can store data is in a disk drive which is also called a direct access storage device.

A disk drive or direct access storage device includes several disks which look similar to 45 rpm records used on a record player or compact disks which are used in a CD player. The disks are stacked on a spindle, much like several 45 rpm records awaiting to be played. In a disk drive, however, the disks are mounted to the spindle and spaced apart so that the separate disks do not touch each other.

The surface of each disk is uniform in appearance. However, in actuality, each of the surfaces is divided into portions where data is stored. There are a number of tracks situated in concentric circles like rings on a tree. Compact disks have tracks as do the disks in a disk drive. The tracks in either the disk drive or the compact disk essentially replace the grooves in a 45 rpm record. Each track in a disk drive is further subdivided into a number of sectors which is essentially just one section of the circumferential track.

Disks in a disk drive are made of a variety of materials. Most commonly, the disk is made of metal or plastic. The material from which the disk is made determines how data is stored on the disk. A plastic disk, such as those used as CD's, stores data using lasers and a laser is used to read the data back. Storage of data on a metal disk entails magnetizing portions of the disk in a pattern which reflects the data.

To store data on a metal disk, the metal disk is magnetized. In order to magnetize the surface of a disk, a small ceramic block which contains a magnetic transducer known as a read/write head is passed over the surface of the disk. More specifically, the read/write head is flown at a height of approximately six millionths of an inch from the surface of the disk and is flown over the track as the read/write head is energized to various states causing the track below to be magnetized to represent the data to be stored.

To retrieve data stored on a magnetic disk, the read/write head is flown over the metal disk. The magnetized portions of the disk induce a current in the read/write head. By looking at output from the read/write head, the data can be reconstructed and then used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own read/write head. This would be comparable to having a stereo that could play both sides of a record at once. Each side would have a stylus which played the particular side of the record.

Disk drives also have something that compares to the tone arm of a stereo record player. There are two types of disk drives, rotary and linear. Rotary disk drives have a tone arm that rotates much like a record player. The tone arm of a rotary disk drive, termed an actuator arm, holds all the transducers or read/write heads, one head for each surface of each disk supported in a structure that looks like a comb. The structure is also commonly called an E block. Like a tone arm, the actuator arms rotate so that the read/write heads attached to the actuator arm can be moved to locations over various tracks on the disk. In this way, the read/write heads can be used to magnetize the surface of the disk in a pattern representing the data at one of several track locations or used to detect the magnetized pattern on one of the tracks of a disk. For example, the needed data may be stored on two different tracks on one particular disk, so to read the magnetic representations of data, the actuator arm is rotated from one track to another track. A linear actuator has a similar actuator arm, however, instead of repositioning by rotation, repositioning is accomplished through linear movement. This particular invention deals with minimizing the time necessary for repositioning the actuator arm.

Increasing the speed at which data can be retrieved is very desirable in a disk drive or direct access storage device. This is due mainly to the fact that decreasing the access time increases the speed at which a computer system can handle data. Since data can be handled more quickly, more transactions can generally be handled by a computer in a particular unit of time.

Attached to the actuator arm is a coil, most commonly known as a voice coil. The voice coil is one of the major portions of an electrical motor, known as the voice coil motor, which is used to move the actuator arm. By controlling the amount and direction of the current passing through the voice coil, the direction and the speed at which the actuator arm can be moved is regulated. Of course, the voice coil does have physical constraints one of which is a maximum current which can be passed through the voice coil for a given supply voltage. When maximum current is passed through the voice coil this is called operating in saturation mode. The amount of current applied to the voice coil during saturation mode is referred to as the saturation current.

Most of the methods for controlling access time include referring to a velocity profile. A velocity profile is a pre-programmed equation or table which lists a desired velocity verses the stopping distance remaining until reaching the target track. The profile velocity value is the highest possible value of velocity the actuator can have at a particular distance so that the actuator can still be decelerated to a stop upon reaching the target track. The amount of deceleration that can be applied to the actuator is a function of many variables including voice coil resistance, file torque constant and power supply voltage. These variables are generally not known for each specific file and as a result, the velocity profile is designed using worst case values to assure that there will always be adequate deceleration capability to stop the actuator upon reaching the target track.

A typical seek is accomplished by calculating distance left to go to the target track, selecting the velocity from the velocity profile which corresponds to the calculated distance to go, determining the actual actuator velocity and subtracting the actual actuator velocity from the selected velocity obtained from the velocity profile. This value is then multiplied by a gain to give a control current output to the voice coil. This method is well known in the art as the closed loop control method.

When the profile velocity is larger than the actual velocity, the result of subtracting actual actuator velocity from the selected velocity obtained from the velocity profile is positive, and the actuator is accelerated. When the profile velocity is less than actual velocity, the result of subtracting actual actuator velocity from the selected velocity from the velocity profile is negative, and the actuator is decelerated. The gain is chosen in the closed loop control method so that it is as high as possible yet still within the limits of stability and such that good conformity to the velocity profile is achieved.

The prior methods have several disadvantages. One of the disadvantages is that the access time or the time necessary to move the actuator arm so the magnetic transducers attached to it can be relocated over another portion of one of the disks, is not minimized. This is due in part to the prior methods tracking the velocity profile of the particular disk file as closely as possible during acceleration and deceleration of the actuator arm. Since the velocity profile is designed assuming worst case conditions so that adequate deceleration is available, then all of the files not operating under worst case conditions operate at less than an optimal level.

SUMMARY OF THE INVENTION

Disclosed is a method for accelerating and decelerating an actuator arm in a disk drive or direct access storage device which results in a shorter seek time than prior methods. The method is to accelerate the actuator arm under open loop control by applying current in saturation mode until the actual velocity exceeds the value of velocity from the velocity profile associated with a particular distance to go to the target track. Unlike prior art methods, saturation current for accelerating the actuator arm will continue to be applied beyond crossing the velocity profile. At a selected distance to go the direction of the current is switched and a deceleration current in saturation mode and in the opposite direction is then applied. The additional distance that acceleration is applied beyond the velocity profile allows reduction in the seek time over the prior art. Application time of deceleration current in the saturation mode is also lengthened. The selected time beyond crossing the velocity profile is selected so that application of saturation current in the opposite direction will bring the actual velocity of the actuator arm back to the profile velocity at a target track or zone of tracks within a short distance left to go before arrival at the desired track. With the short distance left to go, the conventional closed loop profile following control method is used to decelerate the actuator arm until the attached magnetic transducer stops on the desired track.

BRIEF DESCRIPTION OF THE DRAWINGS

For a better understanding of the present invention, reference can be made to the accompanying drawings, in which.

These drawings are not intended as a definition of the invention but are provided solely for the purpose of illustrating the preferred embodiments of the invention described below.

DETAILED DESCRIPTION OF THE PREFERRED EMBODIMENT

Figure 1:
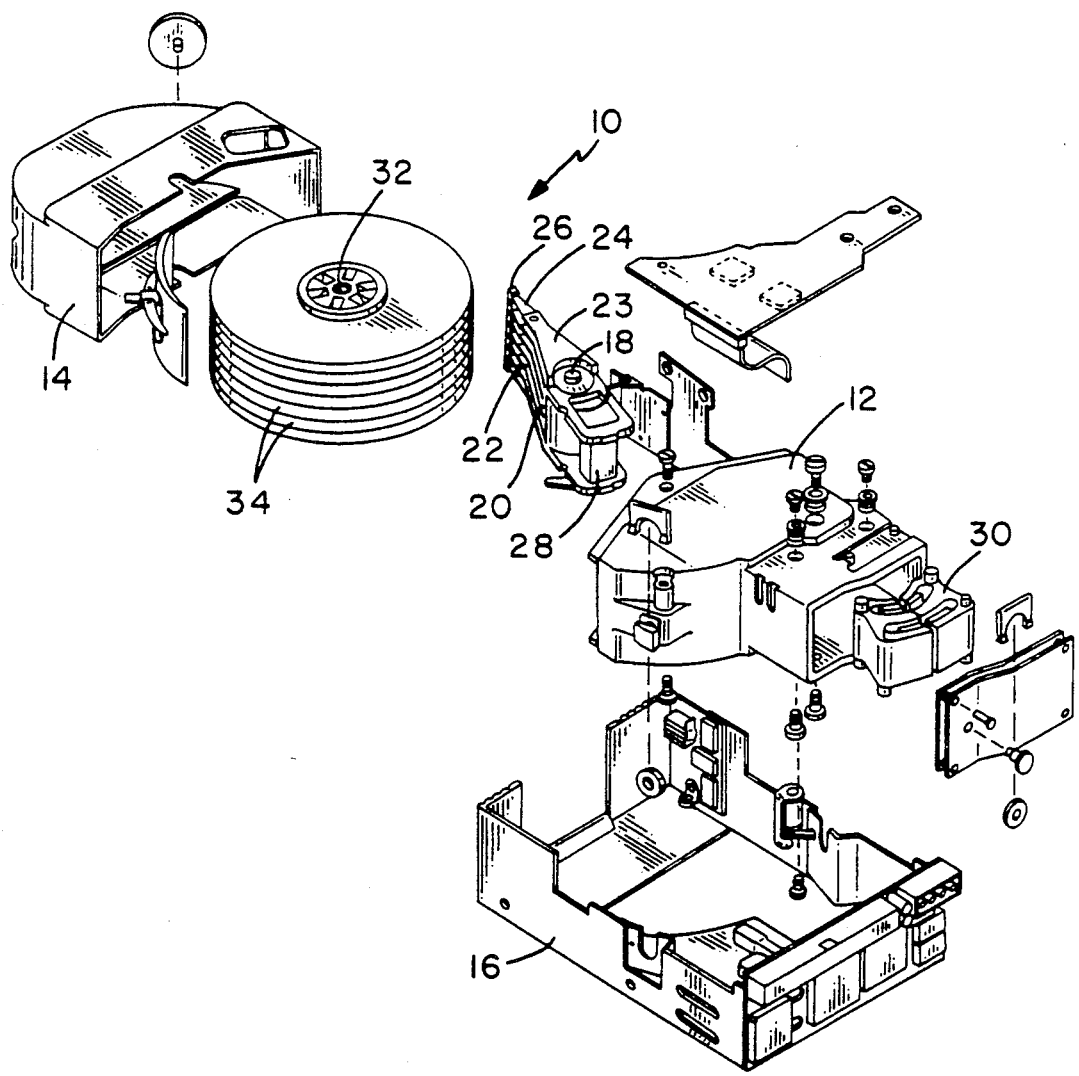
FIG. 1 is an exploded view of a disk drive.

The invention described in this application is useful with all mechanical configurations of disk drives or direct access storage devices ("DASD"). FIG. 1 is an exploded view of a disk drive 10. It should be noted that although a rotary actuator is shown the invention described herein is applicable to linear actuators. The disk drive 10 includes a housing 12, and a housing cover 14 which, after assembly, is mounted within a frame 16. Rotatably attached within the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22, are load springs 24. Attached at the end of each load spring is a slider 26 which carries a magnetic transducer (not shown in FIG. 1). On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator assembly 20 to rotate it about the actuator shaft 18. Also mounted within the housing 12 is a spindle shaft 32. Rotatably attached to the spindle shaft 32 are a number of disks 34. In FIG. 1, eight disks are attached to the spindle shaft 32. As shown in FIG. 1, the disks 34 are attached to the spindle shaft 32 in spaced apart relation.

Figure 2:
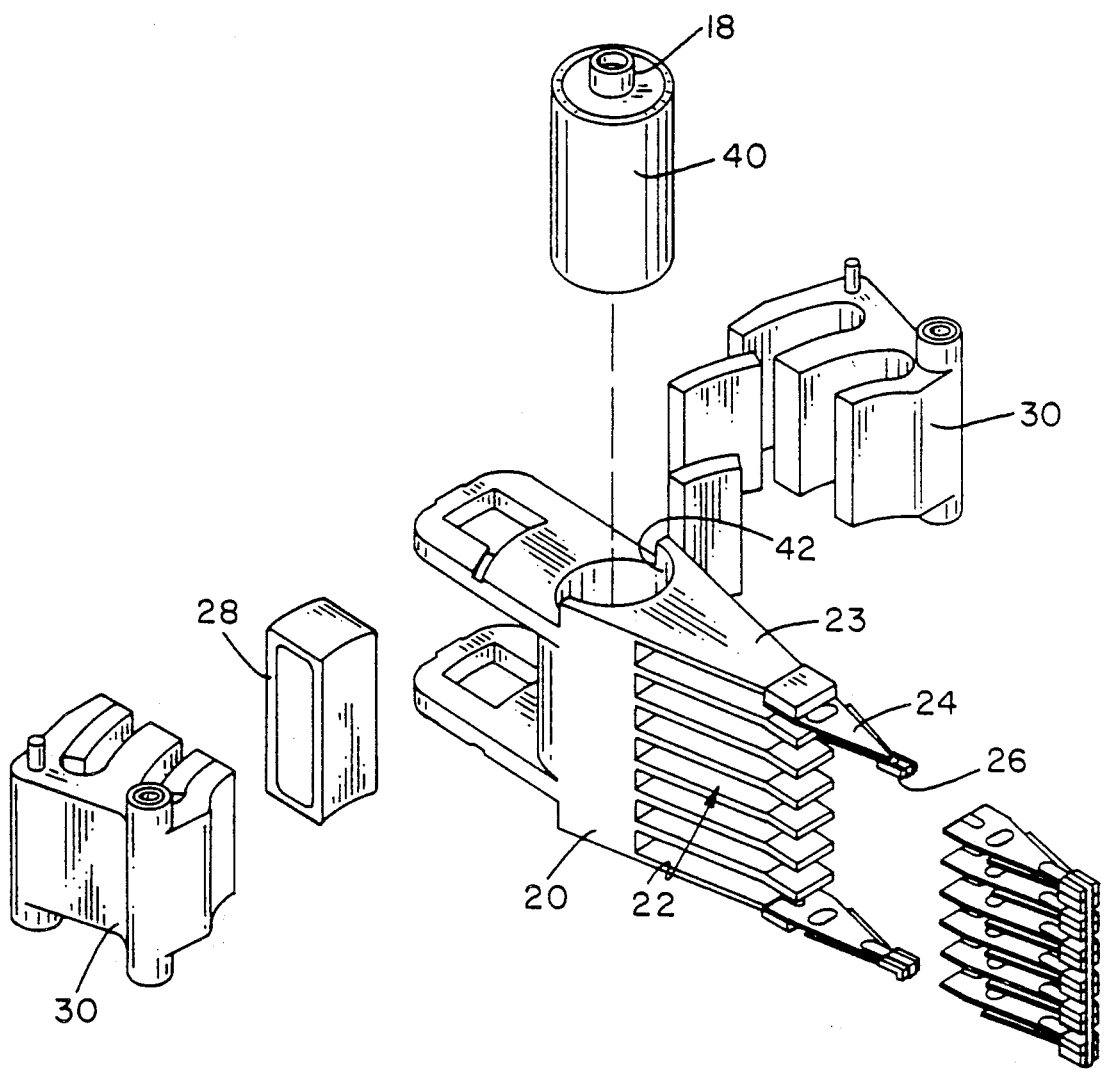
FIG. 2 is an exploded view of the actuator arm assembly of a disk drive.

FIG. 2 details the actuator arm assembly 20 in an exploded view. Each of the arms 23 of the E block or comb assembly 22, except the arms 23 on the top and bottom of the E block 22, carry two load springs. In this particular disk drive 10, there is a slider for both the top and bottom surface of each of the disks 34. The top and bottom arms 23 of the E block 22 have only one load spring 24 since these are used for the top surface of the top disk and the bottom surface of the bottom disk in the stack of disks 34. Attached to the load springs 24 are sliders 26 which include magnetic transducers which magnetize the surface of the disk 34 to represent and store desired data. As is well known in the art of disk drives, each of the disks has a series of concentric tracks onto which the magnetic information is recorded. The sliders 26 and the magnetic transducers incorporated therein are moved over the surface of a particular disk 34 so that a magnetic representation of data can be stored in any of the tracks on the disk 34. In this particular disk drive 10, the transducer movement is rotational and about the actuator shaft 18. Other disk drives may move the actuator arm assembly linearly. Rotating the actuator arm assembly 20 causes the slider 26 and the transducer therein to be repositioned over surface of the disk 34.

FIG. 2 also details the magnets 30 and the voice coil 28 that are key components of a voice coil motor used to apply a force to the actuator assembly 20 and rotate the actuator assembly 20 about the actuator shaft 18 of a bearing cartridge 40. The bearing cartridge is cylindrical in shape and includes the actuator shaft 18 about which the actuator arm assembly rotates. The actuator arm assembly 20 has a first opening or bore 42 therein. The bearing cartridge 40 fits within the bore 42 in the actuator arm assembly 20.

Figure 3:
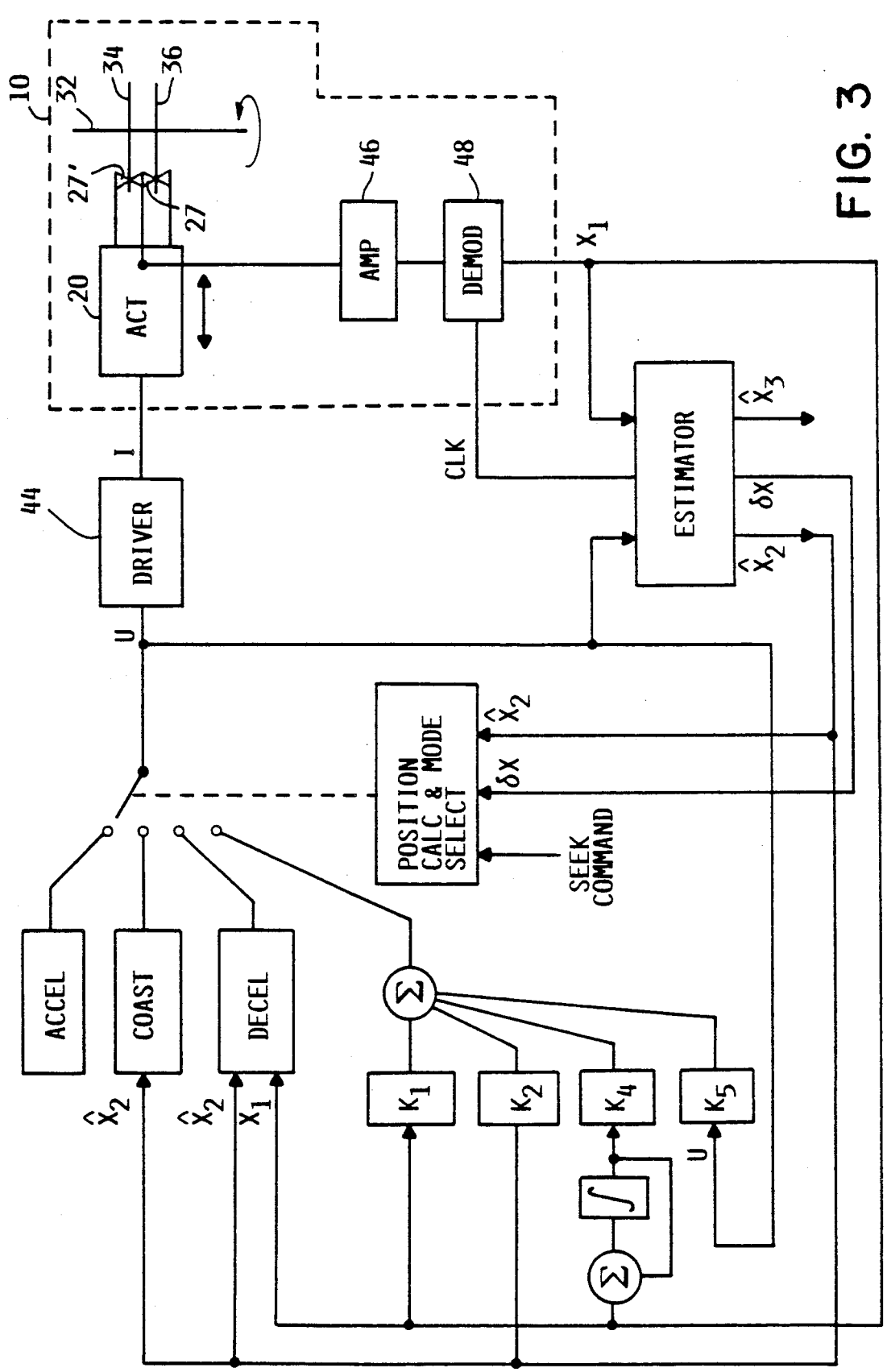
FIG. 3 is a schematic of the actuator arm and the voice coil motor and and other portions of the positioning apparatus for the disk drive.

FIG. 3 shows a schematic of a head positioning system having both real mechanical and electrical components and various functional blocks which are implemented in microcode under the control of a microprocessor. It should be realized that such functional code blocks only exist as modules of code and are not physically separate components.

The disk drive or DASD 10 includes both mechanical and electrical components and various electrical circuits. The disks 34 rotate on spindle shaft 32 which is powered by a motor (not shown). Information is written on or read from the disks 34 by means of heads or magnetic transducers 27 which are within sliders (not shown in FIG. 3) and which are positioned by the actuator arm assembly 20. The actuator assembly 20 moves in response to current from a voltage driver 44 which receives an actuator control voltage signal, U, generated by the microcode.

Disk drives have two methods for determining positions, namely dedicated servo and sector servo. This invention would be equally applicable to disk drives which use either method for determining position of the magnetic transducer.

The disk drive shown is of the dedicated servo type and one of the disks 36 has a surface bearing servo patterns constituting position reference information for a dedicated servo head 27'. Signals from the servo head 27' are amplified by amplifier 46 and demodulated by demodulator 48 to produce a position error signal, $x_1$. The signal, $x_1$ is a digital signal which gives the position of a servo head. From the position of the servo head, the position of the actuator arm assembly or more accurately, the position of the magnetic transducer 27 attached to the arm can be determined.

Figure 4:
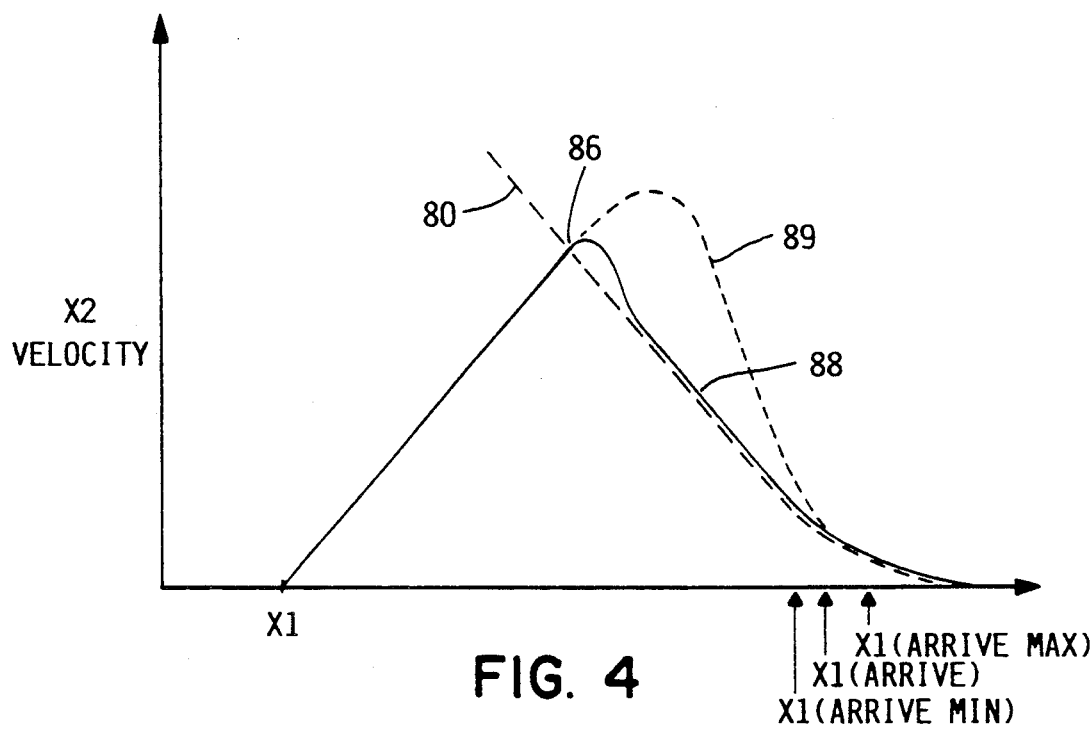
FIG. 4 is a plot showing a velocity profile based on worst case conditions a plot of actual velocity according to the prior art and a plot of the actual velocity according to the inventive method.

FIG. 4 includes a typical plot of a conservative velocity profile 80 for decelerating the actuator arm and the magnetic transducer 27 attached thereto of the disk drive 10. The conservative velocity profile 80 is determined for each particular model of disk drive 10 and is a plot of the velocity change during a seek assuming worst case conditions. The y axis in FIG. 4 is velocity and the x axis reflects the distance to go to reach the target track of the magnetic transducer or head 27. The distance to go is generally measured in number of tracks to go. FIG. 4 shows a plot of a typical conservative velocity profile 80 which continuously decreases.

Also shown in FIG. 4 is a curve 88 which reflects the actual velocity trajectory achieved by using the prior art control methods. The most common method for moving a head or transducer 27 from a first position to a second position on a disk is to accelerate with as much current as possible until a target velocity is achieved and then decelerate and follow the conservative velocity profile 80 to the desired track. The target velocity is achieved when the velocity of the actuator arm and transducer 27 is within a selected amount of a velocity on the conservative velocity profile 80. The curve 88 shows where the typical seek according to the prior art deviates from the conservative velocity profile 80. Typically, the actual velocity of the actuator arm overshoots the conservative velocity profile 80 after it crosses the conservative velocity profile 80 at crossing point 86. Since the velocity is more than desired, the actuator arm is decelerated until it is within an acceptable amount of the conservative velocity profile 80. When the velocity of the actuator arm is within a selected amount of the conservative velocity profile 80 it is said to be under control. As can be seen from curve 88 of FIG. 4, the velocity of the actuator arm is brought under control well before the end of the seek.

The inventive method is also shown in FIG. 4 as curve 89. The essence of the invention is to stay in saturation mode for as much time of the seek as possible. Saturation mode is the maximum amount of current that can be sent to the voice coil on the actuator arm assembly. The amount of current is controlled by a transistor which operates in saturation mode to send the maximum current to the coil. At the beginning of a seek, the saturation current associated with accelerating the actuator arm assembly 20 is delivered to the voice coil. Rather than follow the conservative velocity profile 80 closely after crossing the conservative velocity profile 80, the saturation current associated with acceleration of the voice coil is continued well past the crossing point 86. At a selected point, current in the voice coil is switched to the saturation current associated with decelerating the actuator arm assembly 20. The point at which the current is switched from saturation current associated with acceleration to saturation current associated with deceleration is selected so that the actual velocity of the actuator arm will be under control or within an acceptable amount of the conservative velocity profile 80 in a position where the head 27 is at a short distance to go to the desired track. In other words, unsaturated deceleration of the actuator arm will occur for a shorter amount of time in the disclosed invention when compared to the prior art. The result of having the voice coil (shown in FIGS. 1-3) driven in saturation modes for a greater percentage of the seek time will be a shorter seek time.

Figure 5:
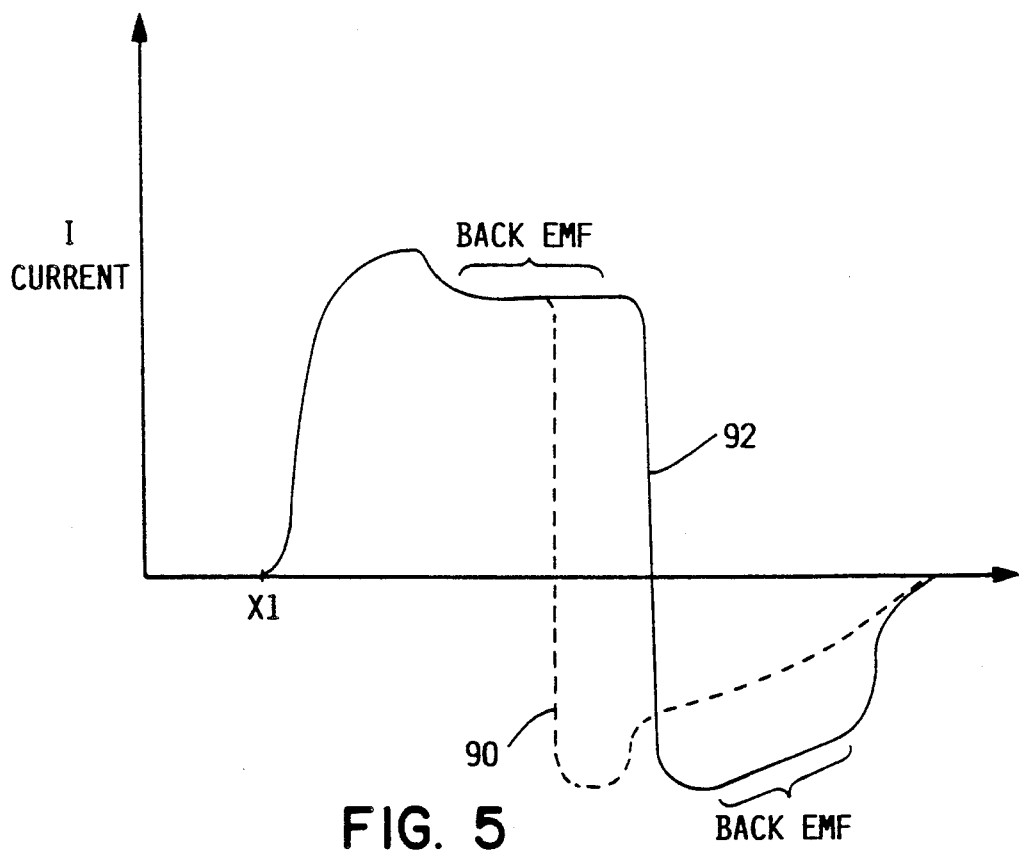
FIG. 5 is a plot showing coil current against distance during a seek according to the prior art and according to the inventive method.

FIG. 5 shows how the current, I, changes with respect to distance. The acceleration changes on the actuator arm assembly 20 correspond to the changes in the current, I, delivered to the voice coil. FIG. 5 includes two plots, the current delivered to the voice coil which corresponds to the prior art method of performing a seek is shown in dotted lines and is referenced as curve 90. The curve 92 corresponds to the current with respect to time for the disclosed method. Curve 92 is shown as a solid line. As can be seen from FIG. 5, the prior art method switches to saturation deceleration current at a distance which corresponds to the crossing point 86 of the conservative velocity profile 80. FIG. 5 shows that in the method disclosed the saturation current is maintained for a greater distance and longer time and then switched to the deceleration saturation current when compared to the prior art method. FIG. 5 also shows that the saturation current associated with deceleration is maintained over a longer distance in the disclosed method. This is shown by the lower flat portion of curve 92 being longer than the lower flat portion of curve 90.

Figure 6:
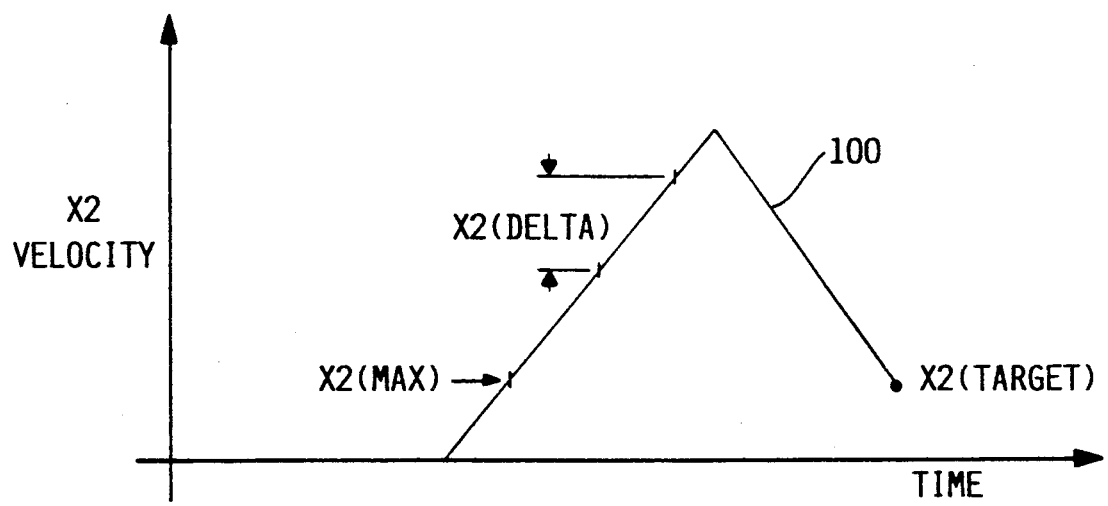
FIG. 6 is a plot of velocity, X2, against time during a seek.

FIG. 6 shows the plot 100 of velocity, also termed X2, against time for the actuator assembly during the seek operation according to the invention. FIG. 6 also shows several values which are important in the determination of when to switch from the saturation current during the acceleration portion to the saturation current during the deceleration portion of the seek. These values will be explained in the following paragraphs.

Figure 7:
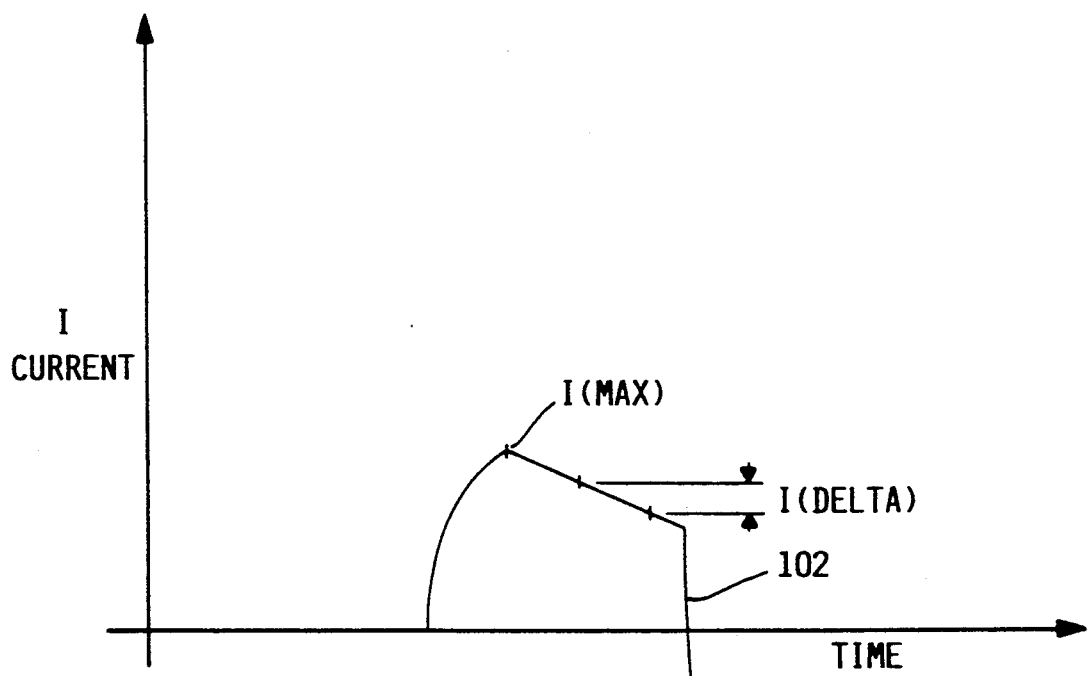
FIG. 7 is a plot of current, I, against time during a seek.

FIG. 7 shows the plot 102 of the current, which corresponds to the acceleration, against time for the actuator assembly during the seek operation according to the invention. This merely illustrates the invention in much the same manner as described with respect to FIG. 5 above. The x-axis in FIG. 7 is time, while the x-axis in FIG. 5 is distance.

The point in time for switching from saturation current during acceleration to saturation current during deceleration can be mathematically derived. The basic mathematical formula used and expressed can be derived from the work theorem of dynamics which states that the work done by a force is equal to the change in kinetic energy of the body. Applying this theorem generally yields the following:

$$Work = F[X1(1) - X1(2)] = \tfrac{1}{2} m[X2(1)^2 - X2(2)^2] \quad \text{EQUATION 1}$$

Where
  $X1(1)$ = a first position
  $X1(2)$ = a second position
  $X2(1)$ = a first velocity
  $X2(2)$ = a second velocity
  $F$ = force = $(m)(a)$
  $m$ = mass
  $a$ = acceleration Denoting the force, F, as (m)(a) and dividing both sides of the equation by (m)(a), the following is obtained:

$$[X1(1) - X1(2)] = \frac{X2(1)^2 - X2(2)^2}{2a} \quad \text{EQUATION 2}$$

This equation is used as the basis for the determining the point in time that deceleration should begin. Equation 2 above is modified by adding an adjustment for slew, which is the number of tracks that the actuator travels before a change in current is reflected in the voice coil. The equation having this adjustment is as follows:

$$X1(min) = X1(target) + slew + \frac{X2(present)^2 - X2(target)^2}{2 \times ACC} \quad \text{EQUATION 3}$$

Where
  X1(min) - minimum distance needed to slow the actuator to a given target velocity. units-tracks A value of position is read from the file once per sample time.
  X1(target) - target position where target velocity is expected. units-tracks
  X2(present) - present velocity. units-tracks/sample
  X2(target) - velocity desired at target position. units-tracks/sample slew - correction factor to account for current slew rate. units-tracks. Formula for calculating slew is:

$$slew = X2(present) \times S$$

Where
  S - number of samples that it takes to reverse the current from acceleration to deceleration. units-samples
  ACC - acceleration available during decelerate phase. units-tracks/sample$^2$ The value X1(min) is calculated at each sample time that occurs during a seek. Sample times occur at regular intervals during the seek time. Also calculated for each sample time is the distance to go to a selected target position X1(target). The distance to go can be determined by using the servo information in the disk drive. The servo information indicates the present track position at the present sample time X1(present). X1(target) can be subtracted from X1(present) to determine how much distance is left before reaching X1(target). The result of this difference is referred to as X1(left to go). X1(target) is generally selected so that there are a number of tracks left to go after arriving at X1(target) before reaching the desired track, X1(desired) from which information must be written to or read from. This allows for a time or distance over which a current less than the saturation current can be used to decelerate the actuator arm assembly of the disk drive using the closed loop method known in the art. It should be noted however that X1(target) could be selected as being equal to X1(desired). The acceleration current in saturation mode is switched to the deceleration current in saturation mode when the calculated value of X1(min) is within a selected value or near the determined value for X1(left to go).

The ACC term, or acceleration available during the deceleration phase, in Equation 3 is determined as follows:

$$ACC = \frac{Kt \times Lhead \times TPM \times T^2 \times (Ipeak + Ibemf)}{J} \quad \text{EQUATION 4}$$

Where
  Kt - Torque constant. units-Newton-meter/amp 1 Newton = 1 Kilogram-meter/second$^2$
  Lhead - Distance to servo head. units-meters
  TPM - Number of tracks per meter. units-tracks/meter
  T - Sample time. units-seconds/sample
  J - Moment of inertia. units-kilogram x meter$^2$
  Ipeak - Peak current capable of being delivered by the power supply. units- amps. Formula for calculating the peak current is:

$$Ipeak = \frac{Vsup}{Rcoil + Rdriver}$$

Where
  Vsup - Power supply voltage. units- volts
  Rcoil - Resistance of voice coil. units-ohms
  Rdriver - Resistance of all other elements in the system (eg. voice coil driver FET's when fully on, current sense resistor, flex cable lead resistance, etc.). units- ohms
  Ibemf - Current available during deceleration due to the back EMF of the moving voice coil. units-amps. Since the coil slows down during deceleration the current available from the back EMF goes down. Therefore the average Ibemf could be assumed to equal one half the Ibemf available at each sample when the X1(min) value is computed. Formula for calculating the back EMF current is:

$$Ibemf = \frac{X2(present) \times Ke \times Kemf}{2 \times Rcoil}$$

Where
Ke - Same value as Kt but units are Volts/radian/second
Kemf - Calibration factor to convert units of numerator to volts. The formula for Kemf is:

$$Kemf = \frac{1}{TPM \times Lhead \times T}$$

The above equations show that ACC is a function of power supply voltage, voice coil resistance, and torque constant. In the past worst case values of the power supply voltage, voice coil resistance, and the torque constant were used to produce a conservative estimate of ACC. This conservative estimate of ACC is then used to generate the conservative velocity profile 80. It can be seen from Equation 3 that the more conservative an estimate of ACC or the lower its value, the larger X1(min) must be. Rather than select worst case values for the parameters of power supply voltage, voice coil resistance and torque constant, reasonable estimates of these three parameters can be obtained from measuring the current in the voice coil 28 during the acceleration portion of a seek, the resistance in the voice coil 28, the temperature of the voice coil 28. It is well known that coil resistance varies with temperature and in many cases the variation is linear over the operating range of the coil. Thus, the measurement of the voice coil temperature yields an estimate of the resistance in the coil.

The coil current measurement is used to estimate the torque constant for the actuator arm. Referring now to FIGS. 6 and 7, measuring the coil current and the corresponding velocity twice during the accelerate phase of the seek allows the change in coil current, I(delta), and velocity, X2(delta), due to voice coil back EMF to be calculated. From the measured value for I(delta), it can be determined how much change in current results from the change in velocity X2(delta). Knowing the values for I(delta) and X2(delta), an estimate of the torque constant can be made using the following equation:

$$Kt = \frac{Rcoil \times I(delta)}{X2(delta) \times Kemf} \quad \text{EQUATION 5}$$

Once again referring to FIGS. 6 and 7, the coil current measurement is also used to determine (Ipeak). The maximum current, I(max), and the corresponding maximum velocity, X2(max), during the acceleration phase of the seek is measured. From these two values, the peak current, I(peak), that will be available during the deceleration phase can be determined using the following formula:

$$I(peak) = I(max) + \frac{X2(max) \times Ke \times Kemf}{Rcoil} \quad \text{EQUATION 6}$$

Several of the values needed to obtain estimates according the above equations are gathered at times other than every regular sample time. The resistance of the voice coil does not change very quickly. As a result, the voice coil resistance is updated prior to each seek. Peak Current (Ipeak) and the torque constant (Kt) are updated on every long seek. Peak current (Ipeak) and torque constant (Kt) can only be updated when long seeks are done because the slew rate of the coil prevents reaching the maximum current condition and the back EMF condition unless the seek is in the acceleration phase for a long enough time. Since the seek is in the acceleration phase for a long enough time on a long seek these values are measured then.

When the measurements of coil temperature, coil resistance or coil current are not available due to cost or some other reason, a second embodiment of the invention can be used. The distance to go at the point where the actuator velocity and the conservative velocity profile 80 converge or comes within a selected value is called X1(arrive). In the second embodiment two points are used to essentially define a zone into which X1(arrive) should fall. The two points are X1(arrive min) and X1(arrive max). Three conditions can occur. If X1(arrive) is less than or occurs before X1(arrive min), then the next seek can accelerate in saturation mode for a longer period of time. Thus, the time when acceleration is switched to deceleration in the saturated mode is delayed. If on the other hand, X1(arrive) is greater than or occurs after X1(arrive max), then the next seek must accelerate in saturation mode for a shorter period of time. Thus, the time when acceleration is switched to deceleration in saturation mode begins sooner when this condition occurs. If X1(arrive) is between X1(arrive min) and X1(arrive max) then no adjustment is made to when the deceleration in saturation mode begins. X1(arrive) is monitored for each seek. In this way, the effects of all factors, such as the temperature change during operation, can be accounted for.

It should be noted that the point in time when deceleration of the actuator arm should start can be determined by the following equation:

$$X1(min) = X1(target) + slew + \frac{X2(present)^2 - X2(target)^2}{2 \times ACC} + ADJ \quad \text{EQUATION 7}$$

Where
ACC - worst case acceleration available during decelerate phase which is used to generate a conservative velocity profile.
ADJ - adjustment term. units - tracks It should be noted that Equation 7, immediately prior, is similar to Equation 3 listed above with an adjustment term, ADJ, added. In addition, the ACC term is the worst case acceleration available during the decelerate phase rather than the term which was estimated as shown above with respect to the first embodiment. In the first embodiment of the invention the ACC term is determined or estimated. In this embodiment, the ACC term is the conservative term and X1(min) is adjusted.

The increments of time for continuing the acceleration in the saturation mode are selected so that ADJ is equal to or less than the number of tracks moved each sample. This is so adjustments from one seek to another are by no more than one sample time.

The amount of adjustment is dependent on seek length. In long seeks the actual velocity of the actuator arm becomes a constant and the ADJ term is the same for the long seeks where this occurs. On shorter seeks the actual velocity of the actuator arm increases as the seeks become more lengthy and as a result, the term ADJ will vary to account for the increased velocity.

The present invention and the best modes of practicing it have been described. It is to be understood that the foregoing description is illustrative only and that other means and techniques can be employed without departing from the full scope of the invention as described in the appended claims.

What is claimed is:

1. A method for controlling the movement of an actuator arm assembly in a disk drive, the actuator arm assembly movement being controlled by controlling the current to a coil of an electrical motor associated with the actuator, said method comprising the steps of:
   selecting a desired target position, and desired target velocity associated with the desired target position;
   applying an acceleration current to the coil of the electrical motor to accelerate the actuator arm assembly;
   determining the position of the actuator arm assembly and the distance of the actuator arm assembly from the target position at a plurality of sample times;
   determining the velocity associated with each of the positions of the actuator arm assembly at each of said pluarlity of sample times;
   determining a minimum distance to decelerate the actuator arm assembly by applying deceleration current in saturation mode, from the velocity associated with each of said plurality of sample times to the target velocity;
   comparing the determined minimum distance, to the distance of the actuator arm assembly from the target position for each of said plurality of sample times; and
   applying deceleration current operating in saturation mode to the coil once the determined minimum distance is within a selected amount of the distance of the actuator arm from the target position for the particular sample time until reaching the desired target.

2. The method of claim 1 wherein the step of selecting a target position comprises the steps of:
   determining the desired position where the actuator will settle and stop; and
   selecting a position a number of tracks away from the desired position.

3. The method of claim 2 wherein the step of determining the minimum distance to decelerate the actuator arm assembly in saturation mode is estimated from values of coil current and coil resistance.

4. The method of claim 2 further comprising the steps of:
   generating a conservative velocity against position profile assuming worst case conditions for deceleration; and
   following the conservative velocity against position profile between the target position and the desired position.

5. The method of claim 3 wherein the deceleration associated with the step of generating the velocity against position profile for decelerating the actuator arm assembly is determined from the following formulas:

$$X1(min) = X1(target) + slew +$$

$$\frac{X2(present)^2 - X2(target)^2}{2 \times ACC} + ADJ$$

Where
   X1(min) - minimum distance needed to slow the actuator to a given target velocity. units-track A value of position is read from the file once per sample time.
   X1(target) - target position where target velocity is expected. units-tracks
   X2(present) - present velocity. units-tracks/sample
   X2(target) - velocity desired at target position. units-tracks/sample
   slew - correction factor to account for current slew rate. units-tracks. Formula for calculating slew is:

$$slew = X2(present) \times S$$

Where
   S - number of samples that it takes to reverse the current from acceleration to deceleration. units-samples
   ACC - acceleration available during decelerate phase. units-tracks/sample$^2$
and, where ACC is determined from:

$$ACC = \frac{Kt \times Lhead \times TPM \times T^2 \times (Ipeak \pm Ibemf)}{J}$$

Where
   Kt - Torque constant. units-Newton-meter/amp 1 Newton = 1 Kilogram-meter/second$^2$
   Lhead - Distance to servo head. units-meters
   TPM - Number of tracks per meter. units- tracks/meter
   T - Sample time. units-seconds/sample
   J - Moment of inertia. units-kilogram x meter$^2$
   Ipeak - Peak current capable of being delivered by the power supply. units- amps. Formula for calculating the peak current is:

$$Ipeak = \frac{Vsup}{Rcoil + Rdriver}$$

Where
   Vsup - Power supply voltage. units-volts
   Rcoil - Resistance of voice coil. units- ohms
   Rdriver - Resistance of all other elements in the system (eg. voice coil driver FET's when fully on, current sense resistor, flex cable lead resistance, etc.). units- ohms
   Ibemf - Current available during deceleration due to the back EMF of the moving voice coil. units-amps. Since the coil slows down during deceleration the current available from the back EMF goes down. Therefore the average Ibemf could be assumed to equal one half the Ibemf available at each sample that we compute the X1(min) value. Formula for calculating the back EMF current is:

$$Ibemf = \frac{X2(present) \times Ke \times Kemf}{2 \times Rcoil}$$

Where
   Ke - Same value as Kt but units are Volts/radian/second

Kemf - Calibration factor to convert units of numerator to volts. The formula for Kemf is:

$$Kemf = \frac{1}{TPM \times Lhead \times T}$$

6. The method of claim 5 further including the step of measuring the coil resistance prior the each seek.

7. The method of claim 6 further comprising the step of measuring the coil current during the acceleration phase of the seek at least twice to determine I(delta).

8. The method of claim 7 wherein the velocities associated with the position of the actuator arm at the beginning and at the end of I(delta) are used to determine the change in velocity, X2(delta), due to the change in current, the values of coil resistance, I(delta) and X2(delta) used in the following formula to estimate the torque constant:

$$Kt = \frac{Rcoil + I(\text{delta})}{X2(\text{delta}) \times Kemf}$$

said torque constant used to estimate ACC, which is used to generate a velocity to position profile for the deceleration under saturation mode.

9. The method of claim 8 further comprising the steps of:
measuring the maximum current, I(max) and the velocity corresponding to maximum current, X2(max) while applying the acceleration current to the coil; and
estimating I(peak) using I(max) and X2(max), I(peak) is used to estimate the ACC term in generating the velocity to position profile:

$$I(\text{peak}) = I(\text{max}) + \frac{X2(\text{max}) \times Ke \times Kemf}{Rcoil}$$

10. A method for controlling the movement of an actuator arm assebmly in a disk drive, the actuator arm assembly movement being controlled by controlling the current to a coil of an electrical motor associated with the actuator, said method comprising the steps of:
generating a conservative velocity against position profile for decelerating the actuator arm assembly so the actuator arm assembly will stop and settle at a desired position;
selecting a first position, X1(arrive max), from the desired position where the actuator will stop and settle;
selecting a second position, X1(arrive min), a number of tracks away from the desired position where the actuator will stop and settle;
applying an acceleration current to the coil of the electrical motor to accelerate the actuator arm assembly;
continuing to accelerate the actuator arm after exceeding the conservative velocity profile;
applying deceleration current in saturation mode to decelerate the coil;
determining a third position, X1(arrive) by determining the position of the actuator arm when the velocity of actuator arm due to the deceleration current in the saturation mode is within a selected value of the conservative velocity against position profile; and
adjusting the time at which the current in the coil is switched from acceleration current to deceleration current in saturation mode when X1(arrive) is not between X1(arrive min) and X1(arrive max).

11. The method of claim 10 wherein the minimum deceleration associated with the worst case conditions is used in the step of generating a conservative velocity against position profile.

12. The method of claim 10 wherein the time at which the current in the coil is switched from acceleration current to deceleration current in saturation mode is delayed when X1(arrive) occurs before X1(arrive min).

13. The method of claim 12 wherein the time is delayed by one sample time.

14. The method of claim 10 wherein the time at which the current in the coil is switched from acceleration current to deceleration current in saturation mode begins sooner when X1(arrive) occurs after X1(arrive max).

15. The method of claim 14 wherein the time is incremented by one sample time.

16. A method for estimating deceleration of an actuator arm assembly by a deceleration current in saturation mode, said method comprising the steps of:
measuring the resistance of the coil before the seek;
measuring the change in coil current during the acceleration portion of the seek;
determining the change in velocity during the acceleration portion of the seek;
measuring the maximum current in the coil during the acceleration portion of the seek; and
determining the maximum velocity associated with the maximum current in coil during the acceleration portion of the seek.

17. The method of claim 16 wherein the estimate of deceleration under saturation mode is determined using the following formula:

$$ACC = \frac{Kt \times Lhead \times TPM \times T^2 \times (Ipeak + Ibemf)}{J}$$

where
Kt - Torque constant. units-Newton-meter/amp 1 Newton = 1 Kilogram-meter/second$^2$
Lhead - Distance to servo head. units-meters
TPM - Number of tracks per meter. units- tracks/meter
T - Sample time. units-seconds/sample
J - Moment of inertia. units-kilogram x meter$^2$
Ipeak - Peak current capable of being delivered by the power supply. units- amps. Formula for calculating the peak current is:

$$Ipeak = \frac{Vsup}{Rcoil + Rdriver}$$

Where Vsup - Power supply voltage. units-volts
Rcoil - Resistance of voice coil. units- ohms
Rdriver - Resistance of all other elements in the system (eg. voice coil driver FET's when fully on, current sense resistor, flex cable lead resistance, etc.). units- ohms
Ibemf - Current available during deceleration due to the back EMF of the moving voice coil. units-amps. Since the coil slows down during deceleration the current available from the back EMF goes down. Therefore the average Ibemf could be assumed to equal one half the Ibemf available at each sample that we compute the X1(min) value. Formula for calculating the back EMF current is:

$$Ibemf = \frac{X2(\text{present}) \times Ke \times Kemf}{2 \times Rcoil}$$

where

Ke - Same value as Kt but units are Volts/radian/second

Kemf - Calibration factor to convert units of numerator to volts. The formula for Kemf is:

$$Kemf = \frac{1}{TPM \times Lhead \times T}$$

wherein, the torque constant, Kt, is estimated using the measured coil resistance, measured change in coil current during the acceleration phase and determined change in velocity according to the following formula:

$$Kt = \frac{Rcoil + I(\text{delta})}{X2(\text{delta}) \times Kemf}$$

and, wherein, the peak current, I(peak) is estimated using the measured maximum current and the determined maximum velocity for the acceleration phase of the seek, according to the following formula:

$$I(\text{peak}) = I(\text{max}) + \frac{X2(\text{max}) \times Ke \times Kemf}{Rcoil}$$

18. The method of claim 17 further comprising the step of measuring the coil current during the acceleration phase of the seek at least twice to determine I(delta).

19. The method of claim 18 wherein the velocities associated with the position of the actuator arm at the beginning and at the end of I(delta) are used to determine the change in velocity, X2(delta), due to the change in current, the values of coil resistance, I(delta) and X2(delta) used in the following formula to estimate the torque constant:

$$Kt = \frac{Rcoil + I(\text{delta})}{X2(\text{delta}) \times Kemf}$$

said torque constant used to estimate ACC, which is used to generate a velocity to position profile for the deceleration under saturation mode.

20. The method of claim 17 further comprising the steps of:
measuring the maximum current, I(max) and the velocity corresponding to maximum current, X2(max) while applying the acceleration current to the coil; and
estimating I(peak) using I(max) and X2(max), I(peak) is used to estimate the ACC term in generating the velocity to position profile:

$$I(\text{peak}) = I(\text{max}) + \frac{X2(\text{max}) \times Ke \times Kemf}{Rcoil}$$

21. An apparatus for controlling the movement of an actuator arm assembly in a disk drive, the actuator arm assembly movement being controlled by controlling the current to a coil of an electrical motor associated with the actuator, said apparatus comprising:

means for generating a conservative velocity against position profile for decelerating the actuator arm assembly so the actuator arm assembly will stop and settle at a desired position;

means for selecting a first position, X1(arrive max), from the desired position where the actuator will stop and settle;

means for selecting a second position, X1(arrive min), a number of tracks away from the desired position where the actuator will stop and settle;

means for applying an acceleration current to the coil of the electrical motor to accelerate the actuator arm assembly;

means for continuing to accelerate the actuator arm after exceeding the conservative velocity profile;

means for applying deceleration current in saturation mode to decelerate the coil;

means for determining a third position, X1(arrive) by determining the position of the actuator arm when the velocity of actuator arm due to the deceleration current in the saturation mode is within a selected value of the conservative velocity against position profile; and means for adjusting the time at which the current in the coil is switched from acceleration current to deceleration current in saturation mode when X1(arrive) is not between X1(arrive min) and X1(arrive max).

22. An apparatus for controlling the movement of an actuator arm assembly in a disk drive, the actuator arm assembly movement being controlled by controlling the current to a coil of an electrical motor associated with the actuator, said apparatus comprising:

means for selecting a desired target position, and desired target velocity associated with the desired target position;

means for applying an acceleration current to the coil of the electrical motor to accelerate the actuator arm assembly;

means for determining the position of the actuator arm assembly and the distance of the actuator arm assembly from the target position at a plurality of sample times;

means for determining the velocity associated with each of the positions of the actuator arm assembly at each of said plurality of sample times;

means for determining a minimum distance to decelerate the actuator arm assembly by applying deceleration current in saturation mode, from the velocity associated with each of said plurality of sample times to the target velocity;

means for comparing the determined minimum distance, to the distance of the actuator arm assembly from the target position for each of said plurality of sample times; and means for applying deceleration current operating in saturation mode to the coil once the determined minimum distance is within a selected amount of the distance of the actuator arm from the target position for the particular sample time until reaching the desired target.

23. A method for controlling the movement of an actuator arm in a disk drive, the actuator arm movement being controlled by energy supplied to a motor associated with the actuator arm, said method comprising the steps of:
determining a conservative velocity to position profile for the actuator arm;

accelerating the actuator arm to a first position and an actual velocity, the actual velocity associated with the first position being substantially greater than the velocity associated with the first position according to the conservative velocity to position profile; and decelerating the actuator arm in saturation mode to a second position which is within a predetermined distance from a desired track, the deceleration in saturation mode reducing the actual velocity associated with the second position to a value within a selected amojunt of the velocity according to the conservative velocity to position profile.

* * * * *